(12) United States Patent
Abughazaleh

(10) Patent No.: US 8,945,507 B2
(45) Date of Patent: Feb. 3, 2015

(54) SYSTEMS AND METHODS FOR OPERATING A GASIFIER

(75) Inventor: John Abughazaleh, Sugar Land, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 90 days.

(21) Appl. No.: 13/091,471

(22) Filed: Apr. 21, 2011

(65) Prior Publication Data

US 2012/0267575 A1    Oct. 25, 2012

(51) Int. Cl.
*C01B 3/24* (2006.01)
*C10J 3/56* (2006.01)
*C10J 3/72* (2006.01)
*C10J 3/54* (2006.01)

(52) U.S. Cl.
CPC ... *C01B 3/24* (2013.01); *C10J 3/56* (2013.01); *C10J 3/726* (2013.01); *C10J 3/54* (2013.01); C01B 2203/0266 (2013.01); C01B 2203/1235 (2013.01); C01B 2203/1604 (2013.01); C10J 2300/1223 (2013.01)
USPC ........................................ 423/650; 48/197 R

(58) Field of Classification Search
USPC ........................................................ 423/650
See application file for complete search history.

(56) References Cited

U.S. PATENT DOCUMENTS

| | | | |
|---|---|---|---|
| 3,920,417 A | 11/1975 | Fernandes | |
| 4,328,007 A | 5/1982 | Rafael | |
| 4,355,586 A | 10/1982 | Brown | |
| 4,378,974 A | 4/1983 | Petit et al. | |
| 4,385,906 A | 5/1983 | Estabrook | |
| 4,400,180 A | 8/1983 | Marion et al. | |
| 4,809,624 A | 3/1989 | Van Der Burgt | |
| 4,881,949 A * | 11/1989 | Brungel et al. | 48/197 R |
| 5,087,271 A | 2/1992 | Stellaccio et al. | |
| 5,145,491 A | 9/1992 | Schmitt et al. | |
| 6,033,447 A * | 3/2000 | Moock et al. | 48/197 R |
| 6,141,796 A | 11/2000 | Cummings | |
| 6,174,161 B1 | 1/2001 | Slavejkov et al. | |
| 7,604,400 B2 | 10/2009 | Thompson et al. | |
| 2003/0093949 A1* | 5/2003 | Goebel et al. | 48/127.9 |
| 2003/0165722 A1* | 9/2003 | Varadaraj et al. | 429/17 |
| 2005/0065392 A1* | 3/2005 | Peterson et al. | 585/943 |
| 2006/0101715 A1 | 5/2006 | Vlok et al. | |
| 2008/0056971 A1 | 3/2008 | Hughes | |

(Continued)

FOREIGN PATENT DOCUMENTS

WO    WO 2009095365 A2 *    8/2009

*Primary Examiner* — Emily Le
*Assistant Examiner* — Anita Nassiri Motlagh
(74) *Attorney, Agent, or Firm* — Gary M. Machetta

(57) ABSTRACT

Systems and methods for operating a gasifier are provided. The method can include combusting a first start-up fuel to produce a first combustion gas. A temperature within the gasifier can be increased from a starting temperature to at least an auto-ignition temperature of a second start-up fuel by introducing the first combustion gas to the gasifier. A second start-up fuel can be introduced directly to the gasifier after the temperature within the gasifier is at least the auto-ignition temperature of the second start-up fuel. At least a portion of the second start-up fuel can be combusted within the gasifier to produce a second combustion gas. The second combustion gas can produce sufficient heat to increase the temperature within the gasifier to a hydrocarbon feedstock gasification temperature. A hydrocarbon feedstock can be introduced to the gasifier. At least a portion of the hydrocarbon feedstock can be gasified within the gasifier to produce a syngas.

20 Claims, 1 Drawing Sheet

(56) References Cited

U.S. PATENT DOCUMENTS

| | | | |
|---|---|---|---|
| 2008/0275278 A1* | 11/2008 | Clark | 585/240 |
| 2009/0093555 A1* | 4/2009 | Stites et al. | 518/702 |
| 2009/0126271 A1* | 5/2009 | Kyo et al. | 48/77 |
| 2009/0188165 A1 | 7/2009 | Ariyapadi et al. | |
| 2009/0294328 A1* | 12/2009 | Iqbal | 208/67 |
| 2010/0044643 A1 | 2/2010 | Wallace | |
| 2011/0120012 A1 | 5/2011 | Balmas et al. | |

* cited by examiner

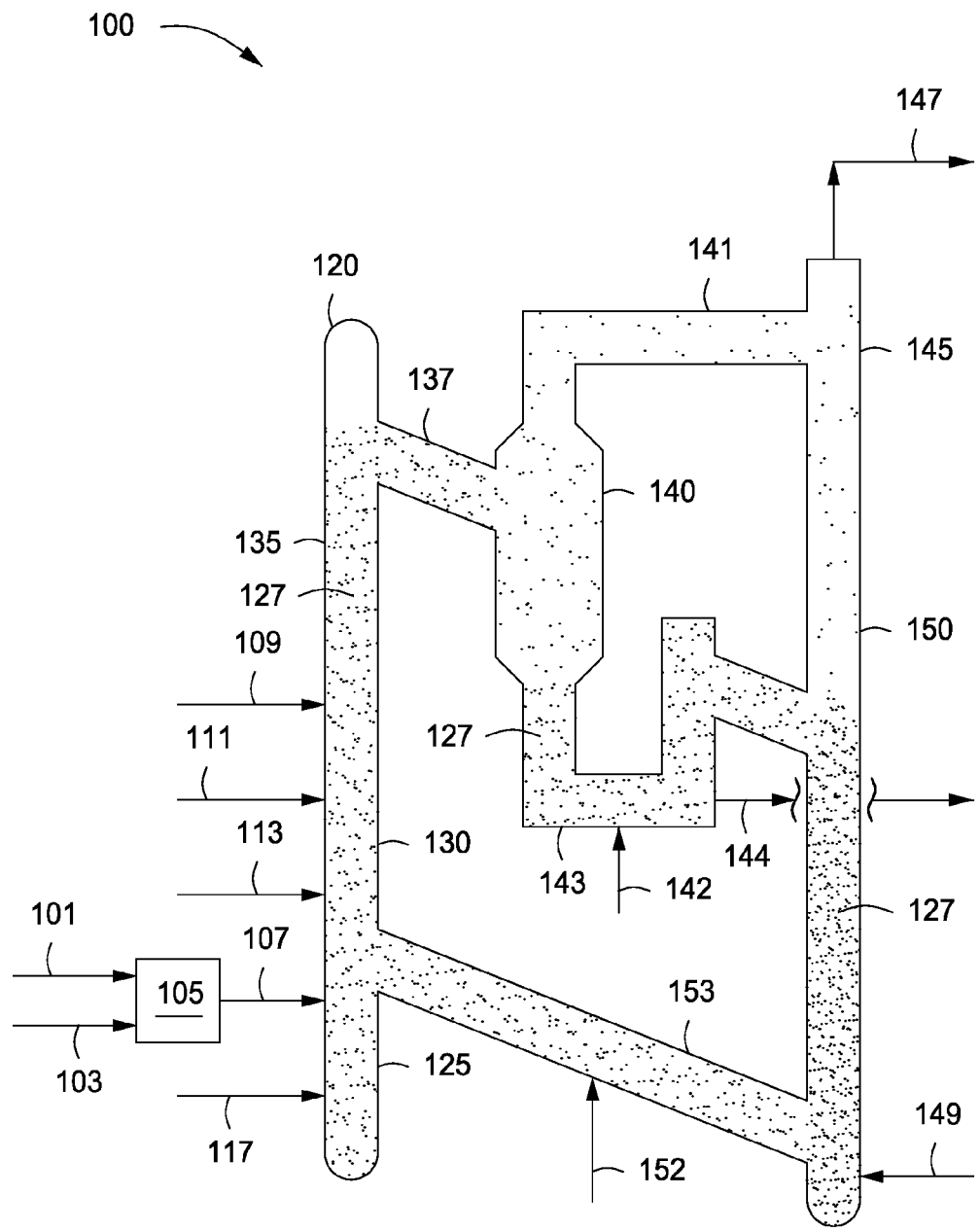

SYSTEMS AND METHODS FOR OPERATING A GASIFIER

BACKGROUND

1. Field

Embodiments described herein generally relate to methods for operating a gasifier. More particularly, such embodiments relate to transitioning a gasifier from an initial or starting state to a hydrocarbon feedstock processing or gasification state.

2. Description of the Related Art

Gasification is a high-temperature process usually conducted at elevated pressure to convert carbon-containing materials into carbon monoxide and hydrogen gas. Since this gas is often used for the synthesis of chemicals or synthetic hydrocarbon fuels, the gas is often referred to as "synthesis gas" or "syngas."

Typical feeds to gasification include petroleum-based materials that are neat or residues of processing materials, such as heavy crude oil, coals, bitumen recovered from tar sands, kerogen from oil shale, coke, and other high-sulfur and/or high metal-containing residues; gases; and various carbonaceous waste materials. Dry or slurried hydrocarbon feedstocks are reacted in the gasifier in a reducing (oxygen-starved) atmosphere at high temperature and (usually) high pressure. The resulting syngas typically contains about 85 percent of the feed carbon content as carbon monoxide, with the balance being a mixture of carbon dioxide and methane.

In order to start the gasifier, a separate start-up burner is used to combust a start-up fuel to produce a combustion gas that is introduced to the gasifier in order to heat the gasifier up to gasification temperatures. Conventional start-up burners are complicated to operate, large, and expensive to construct.

There is a need, therefore, for improved systems and methods for transitioning a gasifier from an initial or starting state to a hydrocarbon feedstock processing state.

BRIEF DESCRIPTION OF THE DRAWINGS

The FIGURE depicts an illustrative gasification system for gasifying one or more hydrocarbon feedstocks, according to one or more embodiments described.

DETAILED DESCRIPTION

Systems and methods for operating a gasifier are provided. The method can include combusting a first start-up fuel to produce a first combustion gas. A temperature within the gasifier can be increased from a starting temperature to at least an auto-ignition temperature of a second start-up fuel by introducing the first combustion gas to the gasifier. A second start-up fuel can be introduced directly to the gasifier after the temperature within the gasifier is at least the auto-ignition temperature of the second start-up fuel. At least a portion of the second start-up fuel can be combusted within the gasifier to produce a second combustion gas. The second combustion gas can produce sufficient heat to increase the temperature within the gasifier to a hydrocarbon feedstock gasification temperature. A hydrocarbon feedstock can be introduced to the gasifier. At least a portion of the hydrocarbon feedstock can be gasified within the gasifier to produce a syngas.

In one or more embodiments, one or more gasifiers can be transitioned from a first or initial state, e.g., an off or non-gasifying state, to a hydrocarbon feedstock processing state, e.g., a gasifying state, using heat provided from a combination of two or more combustion gases. For example, a first combustion gas and a second combustion gas can be used to transition the gasifier from the first state to the hydrocarbon feedstock processing state. The first combustion gas and the second combustion gas can be produced by combusting a first start-up fuel and a second start-up fuel, respectfully. Heat provided from the first combustion gas can be used to transition the gasifier from the first or initial state to a second or intermediate state. Heat provided from the second combustion gas can be used to transition the gasifier from the second or intermediate state to the hydrocarbon feedstock processing state. In other words, heat from the two or more combustion gases can be used to start the gasifier. Depending, at least in part, on the particular conditions of the first or initial state of the gasifier, the gasifier can be transitioned from the first or initial state to the hydrocarbon feedstock processing state using only the second combustion gas. For example, if the temperature within the gasifier when at the first state is sufficient, e.g., above an auto-ignition temperature of the second start-up fuel, the gasifier can be transitioned from the first state to the hydrocarbon feedstock processing state using only the second combustion gas.

The first combustion gas can be produced external to the gasifier and introduced to the gasifier to increase a temperature and/or a pressure within the gasifier to the intermediate or second state. For example, the first start-up fuel can be combusted external to the gasifier within a startup burner, furnace, or any other combustion device, system, or any combination thereof, to produce the first combustion gas and the first combustion gas can be introduced via a conduit, duct, line, or other means to the gasifier. The first combustion gas can be introduced to one or more locations within the gasifier through one or more conduits, ducts, lines, or other means or any combination thereof to the gasifier. The second combustion gas can be produced within the gasifier. For example, the second start-up fuel can be introduced directly to the gasifier and combusted within the gasifier instead of external to the gasifier. One or more second start-up fuel nozzles or other inlet devices can be disposed on the gasifier and adapted or configured to introduce the second start-up fuel thereto. As used herein, the term "first combustion gas" refers to a combustion gas generated or produced by combusting one or more first start-up fuels external or outside the gasifier. As used herein, the term "second combustion gas" refers to a combustion gas of which at least a portion of is generated or produced by combusting one or more second start-up fuels within the gasifier. For example, all of the second combustion gas can be produced within the gasifier by combusting at least a portion of the second start-up fuel within the gasifier. In another example, a first portion or fraction of the second start-up fuel can be combusted external to the gasifier and a second portion of the second start-up fuel can be combusted within the gasifier. Components of the gasification system can be sensitive to an oxygen content of any start-up gases, e.g., the first and second combustion gases. Therefore, any oxygen entering as, for example, excess air required for stable external burner operation, can be diluted with one or more inert gases, such as nitrogen.

The combination of two or more combustion gases or alternatively only the second combustion gas can improve the process of transitioning the gasifier between the first state and the hydrocarbon feedstock processing state. The external combustion step, as in a fired burner, for example, is more expensive, has lower thermal efficiency, and requires significant amounts of excess air, as compared to the second combustion gas that can be produced within the gasifier. As such, the second combustion gas produced within the gasifier can reduce both capital and operating costs by reducing the size of the external start-up burner required to produce the first combustion gas. Additionally, the use of the second combustion gas produced within the gasifier can reduce the amount of inert gas, excess air, and/or the amount of fuel required to transition the gasifier between the first state and the hydrocarbon feedstock processing state. For example, the second combustion gas or the combination of the first combustion gas and the second combustion gas can reduce the overall energy input required to transition the one or more gasifiers. The second combustion gas or the combination of the first combustion gas and the second combustion gas can also substantially reduce the size of and/or eliminate the need for an external start-up burner required to combust the first start-up fuel in order to produce the first combustion gas as compared to starting the same gasifier without the use of the second start-up fuel and the second combustion gas produced therefrom. For example the size of the external start-up burner can be reduced by about 10%, about 20%, about 30%, about 40%, about 50% or more when transitioning the gasifier from the first state and the hydrocarbon feedstock processing state while also using the second start-up fuel as compared to transitioning the gasifier from the first state to the hydrocarbon processing state using only the external start-up burner, i.e., no second start-up fuel.

The start-up burner used in starting the gasifier with the combination of two or more combustion gases can have a turn down ratio of about 4 or less, about 3 or less, or about 2 or less. As used herein, the term "turn down ratio" refers to the ratio of the maximum firing capability of the start-up burner to the minimum firing capability of the start-up burner. The second combustion gas or the combination of the first combustion gas and the second combustion gas can also reduce the time required to transition the gasifier from the first state to the hydrocarbon feedstock processing state as compared to transitioning the same gasifier from the same first state to the same hydrocarbon feedstock processing state using only the first combustion gas. For example, the amount of time required to transition the gasifier from the first state to the hydrocarbon feedstock processing state when using the second combustion gas alone or in combination with the first combustion gas can be reduced by about 10%, about 15%, about 20%, about 25%, about 30%, or about 35%, as compared to the same gasifier using only the first combustion gas. The use of the second combustion gas produced within the gasifier can also reduce the amount of excess air required to transition the gasifier. Reducing the amount of excess air can reduce the amount of fuel required, and can enable a higher rate of transitioning the gasifier from the first state to the hydrocarbon feedstock processing state. Inert gas consumption can also be reduced.

The first start-up fuel and the second start-up fuel can be the same or different. The first and second start-up fuels can be gases, liquids, solids, or any combination thereof. For example, the first and/or second start-up fuels can include one or more gaseous hydrocarbons. In another example, the first and/or second start-up fuels can include one or more liquid hydrocarbons. In another example, the first and/or second start-up fuels can include one or more solid hydrocarbons. Preferably the first start-up fuel includes one or more hydrocarbons that are gaseous and/or liquid at room temperature and atmospheric pressure. Preferably the second start-up fuel includes one or more hydrocarbons that are gaseous and/or liquid at room temperature and atmospheric pressure.

Hydrocarbons suitable for use as the first and/or second start-up fuel can include, but are not limited to, any hydrocarbon or combination of hydrocarbons having from 1 to about 40 carbon atoms, from 1 to about 30 carbon atoms, or from 1 to about 20 carbon atoms. Suitable hydrocarbons for use as the first and/or second start-up fuels can include alkanes, cycloalkanes, alkenes, cycloalkenes, alkynes, alkadienes, aromatics, alcohols, or any combination thereof. Suitable mixtures of hydrocarbons that can be used as the first and/or second start-up fuel can include, but are no limited to, natural gas, naphtha, gas oil, fuel oil, diesel, gasoline, kerosene. Other suitable materials for use as the first and/or second start-up fuels can include, but are not limited to, tars, asphaltenes, coal, hydrogen, biomass, or any combination thereof. In at least one example, the first start-up fuel can be or include, but is not limited to, coal, wood, asphaltenes, or any combination thereof. In at least one example, the second start-up fuel can be or include, but is not limited to, diesel, gasoline, kerosene, naphtha, or any combination thereof.

The first and/or second start-up fuel can have a low sulfur content which can reduce or minimize sulfur emissions during transitioning the gasifier from the first state to the hydrocarbon feedstock processing state. For example, the first and/or second start-up fuel can contain less than about 200 ppm, less than about 150 ppm, less than about 100 ppm, less than about 75 ppm, less than about 50 ppm, or less than about 30 ppm sulfur and/or sulfur containing compounds. In another example, the first and/or second start-up fuel can contain less than about 40 ppm, less than about 25 ppm, less than about 20 ppm, less than about 15 ppm, less than about 10 ppm, less than about 5 ppm, or less than about 1 ppm sulfur and/or sulfur containing compounds. The second start-up fuel can have an auto-ignition temperature of less than about 700° C., less than about 650° C., less than about 600° C., less than about 550° C., less than about 500° C., less than about 450° C., less than about 400° C., less than about 350° C., less than about 300° C., less than about 250° C., or less than about 200° C. For example, the second start-up fuel can have an auto-ignition temperature ranging from about 100° C. to about 600° C., about 500° C. to about 600° C., about 250° C. to about 550° C., about 300° C. to about 600° C., about 350° C. to about 600° C., about 400° C. to about 600° C., about 450° C. to about 600° C., about 305° C. to about 325° C., about 540° C. to about 560° C., or about 245° C. to about 265° C. In another example, the second start-up fuel can have an auto-ignition temperature of at least 200° C., at least 250° C., at least 300° C., at least 350° C., at least 375° C., at least 400° C., at least 450° C., at least 500° C. and less than about 700° C., less than about 650° C., or less than about 600° C.

Considering particular second start-up fuels in more detail, suitable diesel fuels for use as the second start-up fuel can include hydrocarbons having about 8 carbon atoms to about 25 carbon atoms (C8 to C25 hydrocarbons). The diesel fuel can have an average molecular weight of about 200, a specific gravity of about 0.85, a boiling point ranging from about 180° C. to about 340° C., and an auto-ignition temperature ranging from about 305° C. to about 325° C., e.g., about 315° C. Suitable naphtha fuels for use as the second start-up fuel can include hydrocarbons having about 5 to about 12 carbon atoms (C5 to C12 hydrocarbons). The naphtha fuel can have a molecular weight ranging from about 100 to about 215, a specific gravity of about 0.7, a boiling point ranging from about 30° C. to about 200° C., and an auto-ignition temperature ranging from about 540° C. to about 560° C., e.g., about 550° C. Suitable gasoline fuels for use as the second start-up fuel can include hydrocarbons having about 4 to about 12 carbon atoms (C4 to C12 hydrocarbons). The gasoline fuel can have a molecular weight ranging from about 100 to about 105, a specific gravity of about 0.72 to about 0.78, a boiling point ranging from about 26° C. to about 225° C., and an auto-ignition temperature ranging from about 245° C. to about 265° C., e.g., about 257° C.

Prior to introducing the first combustion gas to the gasifier, the temperature within the gasifier can be at a first or initial/starting temperature. The initial or starting temperature within the gasifier can be less than a temperature within the gasifier when the gasifier is in or at the second or intermediate state. For example, the initial or starting temperature within the gasifier can be room temperature, e.g., −20° C. to about 35° C. In another example the initial or starting temperature within the gasifier can be any temperature less than an auto-ignition temperature of the second start-up fuel. The second start-up fuel can have an auto-ignition temperature of about 200° C. or more, about 250° C. or more, about 300° C. or more about 350° C. or more, about 400° C. or more, about 450° C. or more, about 500° C. or more, or about 550° C. or more. As such, the first combustion gas can be used to increase the temperature within the gasifier from the initial or starting temperature to a temperature at or above a second or intermediate temperature of about 200° C. or more, about 250° C. or more, about 300° C. or more about 350° C. or more, about 400° C. or more, about 450° C. or more, about 500° C. or more, or about 550° C. or more. In other words, the temperature within the gasifier can be increased from the starting temperature to at least an auto-ignition temperature of the second start-up fuel by introducing the first combustion gas to the gasifier. In yet another example, the initial or starting temperature within the gasifier can be any temperature greater than an auto-ignition temperature of the second start-up fuel, but less than a hydrocarbon feedstock processing temperature, e.g., a gasification temperature of a hydrocarbon feedstock. In this example, the first start-up fuel and the start-up burner can be deleted and the gasifier can be transitioned from the first or initial state to the hydrocarbon feedstock processing state using only the second start-up fuel.

Prior to introducing the first combustion gas to the gasifier, the pressure within the gasifier can be at a first or initial/starting pressure. The initial or starting pressure within the gasifier can range from a low of about 25 kPa, about 50 kPa, about 101 kPa, or about 150 kPa to a high of about 600 kPa, about 800 kPa, or about 1,000 kPa. For example, the initial or starting pressure within the gasifier can be about 400 kPa to about 800 kPa, about 500 kPa to about 700 kPa, or about 550 kPa to about 650 kPa. Introducing the first combustion gas to the gasifier can also be used to increase the pressure within the gasifier from the initial or starting pressure to a second or intermediate pressure. The second or intermediate pressure can range from a low of about 50 kPa, about 100 kPa, about 200 kPa to a high of about 600 kPa, about 800 kPa, about 1,000 kPa, about 1,200 kPa, or about 1,400 kPa.

The temperature within the gasifier when in the second or intermediate state can be at or above an auto-ignition temperature of the second start-up fuel. As such, once the temperature within the gasifier has been increased to the second or intermediate state, the second start-up fuel can be introduced directly to the gasifier where at least a portion of the second start-up fuel can be auto-ignited and combusted to produce the second combustion gas. The second start-up fuel can be introduced to the gasifier downstream of the first combustion gas. As such, heat provided from the first combustion gas can be used to auto-ignite the second start-up fuel.

A sufficient amount of one or more oxidants can be present within the gasifier in order to combust at least a portion of the second start-up fuel therein. The oxidant can be introduced to the gasifier in any desired manner. For example, the oxidant can be introduced to the gasifier as a component of the first combustion gas, e.g., as a product of combusting the first start-up fuel and/or added or mixed with the first combustion gas. In another example, the oxidant can be independently or separately introduced to the gasifier. In another example, the second start-up fuel can be mixed or otherwise combined with the oxidant and the mixture of the second start-up fuel and oxidant can be introduced to the gasifier. In another example, the oxidant can be mixed with one or more other fluids such as steam and/or nitrogen and introduced to the gasifier. In another example, the oxidant introduced to the gasifier can be provided from a combination of at least two of the first combustion gas, as a component of the second start-up fuel, independently introduced to the gasifier, and mixed with one or more other fluids such as steam and/or an inert gas such as nitrogen.

The amount of oxidant present within the gasifier for combusting the second start-up fuel can be controlled such that an oxidant concentration within the second combustion gas, after combusting the second start-up fuel, is less than about 1 mol %, less than about 0.5 mol %, less than about 0.3 mol %, less than about 0.1 mol %, less than about 0.05 mol %, or less than about 0.01 mol %. For example, the amount of oxidant present in the gasifier after combusting the second start-up fuel therein can be zero or can range from a low of about 0.05 mol %, about 0.1 mol %, or about 0.2 mol % to a high of about 0.5 mol %, about 0.7 mol %, or about 1 mol %. In another example, the amount of oxidant introduced to the gasifier can be about the stoichiometric amount of oxidant required for complete combustion of the second start-up fuel or less than the stoichiometric amount of oxidant required for complete combustion of the second start-up fuel. As such, in at least one example, a portion of the second start-up fuel can remain un-combusted in order to ensure the oxidant introduced to the gasifier is consumed in the combustion of the second start-up fuel. In one or more embodiments, the oxidant present within the gasifier can be less than about 90 percent, less than about 80 percent, less than about 70 percent, less than about 60 percent, less than about 50 percent, or less than about 40 percent of the stoichiometric amount of oxygen required for complete combustion of all the carbon supplied to the gasifier.

The one or more oxidants can include air, oxygen, essentially oxygen, oxygen-enriched air, ozone, hydrogen peroxide, an essentially nitrogen-free oxidant, or any combination thereof. As used herein, the term "essentially oxygen" refers to a fluid containing more than 50 vol % oxygen. As used herein, the term "oxygen-enriched air" refers to a fluid containing about 21 vol % oxygen to about 50 vol % oxygen. Oxygen-enriched air and/or essentially oxygen can be obtained, for example, from cryogenic distillation of air, pressure swing adsorption, membrane separation, or any combination thereof. As used herein, the term "essentially nitrogen-free," refers to an oxidant that contains about 5 vol % nitrogen or less, about 4 vol % nitrogen or less, about 3 vol % nitrogen or less, about 2 vol % nitrogen or less, or about 1 vol % nitrogen or less.

Heat from the second combustion gas can be used to heat the gasifier from the second or intermediate temperature to a hydrocarbon feedstock processing temperature. For example, heat from the second combustion gas can be used to increase the temperature within the gasifier to a temperature sufficient to gasify at least a portion of a hydrocarbon feedstock. In another example, heat from the second combustion gas can be used to increase the temperature within the gasifier to a temperature sufficient to gasify all of a hydrocarbon feedstock. As such, the terms "hydrocarbon feedstock processing temperature" and "gasification temperature," can be used interchangeably and refer to a temperature at or above a temperature sufficient to gasify at least a portion of a hydrocarbon feedstock.

The temperature sufficient to gasify at least a portion of the hydrocarbon feedstock and/or all of the hydrocarbon feedstock processing temperature can be about 700° C. or more, about 750° C. or more, about 800° C. or more, about 850° C. or more, about 900° C. or more, about 950° C. or more, about 1,000° C. or more, or about 1,050° C. or more. For example, the final or operating temperature within the gasifier can range from about 700° C. to about 1,300° C., about 800° C. to about 1,200° C., about 900° C. to about 1,100° C., or about 750° C. to about 1,150° C.

In one or more embodiments, if the starting or initial temperature within the gasifier is greater than the auto-ignition temperature of the second start-up fuel, but below a gasification temperature of a hydrocarbon feedstock, the second start-up fuel can be introduced directly to the gasifier without the use of or need for the first start-up fuel. In other words, depending, at least in part, on the particular temperature and/or pressure within the gasifier when in the first or initial state, the gasifier can be transitioned from the first or initial state to the hydrocarbon feedstock processing state using only the second start-up fuel. For example, the hydrocarbon feedstock introduced to the gasifier when operating at normal process conditions could be interrupted and the temperature within the gasifier could decrease below the gasification temperature. As such, the second start-up fuel could be introduced to the gasifier prior to the temperature falling below the second or intermediate temperature and the second combustion gas could be used to maintain the gasifier at the hydrocarbon feedstock gasification temperature until the hydrocarbon feedstock (or another hydrocarbon feedstock) could be reintroduced to the gasifier.

The combustion of the second start-up fuel can also be used to increase the pressure within the gasifier from the second or intermediate pressure to a hydrocarbon feedstock processing pressure. The hydrocarbon feedstock processing pressure can range from a low of about 1,200 kPa, about 1,300 kPa, or about 1,400 kPa to a high of about 1,700 kPa, about 2,000 kPa, about 2,300 kPa, or about 2,700 kPa. For example, the hydrocarbon feedstock processing pressure can range from about 1,400 kPa to about 1,800 kPa, about 1,700 kPa to about 2,200 kPa, or about 1,850 kPa to about 2,450 kPa. In addition to or in lieu of using the first and/or second combustion gases to increase the pressure within the gasifier to the second/intermediate pressure and/or the hydrocarbon feedstock processing pressure, one or more compressed gases, e.g., compressed nitrogen, syngas, carbon dioxide, or any combination thereof, can be introduced to the gasifier in order to increase the pressure therein.

Once the gasifier has been transitioned to the hydrocarbon feedstock processing state one or more hydrocarbon feedstocks can be introduced to the gasifier and at least partially gasified therein to produce gasified hydrocarbons or syngas. In one or more embodiments, at least a portion of the hydrocarbon feedstock can also be combusted within the gasifier to provide a third combustion gas. In one or more embodiments, at least a portion of the hydrocarbon feedstock can also be vaporized in the presence of the third combustion gas to produce vaporized hydrocarbons. In one or more embodiments, at least a portion of the hydrocarbon feedstock can also be cracked in the presence of the gasified hydrocarbons to produce cracked hydrocarbons. As discussed in more detail below, the gasifier can also include a circulating particulates or solids. In one or more embodiments, at least a portion of the hydrocarbon feedstock can deposit onto the particulates to produce carbon-containing particulates or "coked" particulates. At least a portion of the carbon deposited on the particulates can be combusted within the gasifier to produce a portion of the third combustion gas and regenerated particulates. As such, the hydrocarbon feedstock can be combusted, vaporized, cracked, gasified, and/or deposited onto solids within the gasifier. In one or more embodiments, at least a portion of the third combustion gas, gasified hydrocarbons, vaporized hydrocarbons, and cracked hydrocarbons can be selectively separated from the hydrocarbon containing solids to provide a hot gas product or syngas product. Also, the first and/or second combustion gases, if present, can be recovered with the hot gas or syngas product.

The syngas product can contain about 60 vol % or more carbon monoxide and hydrogen with additional components including primarily carbon dioxide and methane. For example, the syngas product can contain about 90 vol % or more carbon monoxide and hydrogen, about 95 vol % or more carbon monoxide and hydrogen, about 97 vol % or more carbon monoxide and hydrogen, or about 99 vol % or more carbon monoxide and hydrogen. In one example, the carbon monoxide content of the syngas product can range from a low of about 10 vol %, about 20 vol %, or about 30 vol % to a high of about 50 vol %, about 70 vol % or about 85 vol %. In another example, the carbon monoxide content of the syngas product can range from a low of about 15 vol %, about 25 vol %, or about 35 vol % to a high of about 65 vol %, about 75 vol % or about 85 vol %. The hydrogen content of the syngas product can range from a low of about 1 vol %, about 5 vol %, or about 10 vol % to a high of about 30 vol %, about 40 vol % or about 50 vol %. For example, the hydrogen content of the syngas product can range from about 20 vol % to about 30 vol %.

The syngas product can contain less than about 25 vol % or less, about 20 vol % or less, about 15 vol % or less, about 10 vol % or less, or about 5 vol % or less of combined nitrogen, methane, carbon dioxide, water or steam, hydrogen sulfide, and hydrogen chloride. The carbon dioxide content of the syngas product can be about 25 vol % or less, about 20 vol % or less, about 15 vol % or less, about 10 vol % or less, about 5 vol % or less, about 3 vol % or less, about 2 vol % or less, or about 1 vol % or less. The methane content of the syngas product can be about 15 vol % or less, about 10 vol % or less, about 5 vol % or less, about 3 vol % or less, about 2 vol % or less, or about 1 vol % or less. The water content of the syngas product can be about 40 vol % or less, about 30 vol % or less, about 25 vol % or less, about 20 vol % or less, about 15 vol % or less, about 10 vol % or less, about 5 vol % or less, about 3 vol % or less, about 2 vol % or less, or about 1 vol % or less. The syngas product can be nitrogen-free or essentially nitrogen-free, e.g., containing about 0.5 vol % or less nitrogen.

The hydrocarbon feedstock can include any carbon containing material or combination of carbon containing materials, whether gas, liquid, solid, or any combination thereof. For example, the hydrocarbon feedstock can include, but is not limited to, biomass (e.g., plant and/or animal matter an/or plant and/or animal derived matter); coal (high-sodium and low-sodium lignite, lignite, subbituminous, and/or anthracite, for example); oil shale; coke; tar; asphaltenes; low ash or no ash polymers; hydrocarbon-based polymeric materials; and/or by-products derived from manufacturing operations. The hydrocarbon-based polymeric materials can include, for example, thermoplastics, elastomers, rubbers, including polypropylenes, polyethylenes, polystyrenes, including other polyolefins, homo polymers, copolymers, terpolymers, block copolymers, and blends thereof; PET (polyethylene terephthalate), poly blends, poly-hydrocarbons containing oxygen; heavy hydrocarbon sludge and bottoms products from petroleum refineries and petrochemical plants such as hydrocarbon waxes; blends thereof, derivatives thereof; and combinations thereof.

In one or more embodiments, the hydrocarbon feedstock can include a mixture or combination of two or more carbonaceous materials. In one or more embodiments, the hydrocarbon feedstock can include a mixture or combination of two or more low ash or no ash polymers, biomass derived materials, or by-products derived from manufacturing operations. In one or more embodiments, the hydrocarbon feedstock can include one or more carbonaceous materials combined with one or more discarded consumer products, such as carpet and/or plastic automotive parts/components including bumpers and dashboards. Such discarded consumer products are preferably suitably reduced in size to fit within the gasifier. In one or more embodiments, the hydrocarbon feedstock can include one or more recycled plastics such as polypropylene, polyethylene, polystyrene, derivatives thereof, blends thereof, or any combination thereof. Accordingly, the process can be useful for accommodating mandates for proper disposal of previously manufactured materials.

The hydrocarbon feedstock, if solid, can have an average particle size ranging from a low of about 1 µm, about 10 µm, about 50 µm, about 100 µm, about 150 µm, or about 200 µm to a high of about 350 µm, about 400 µm, about 450 µm, or about 500 µm. For example, the average particle size of the hydrocarbon feedstock, if solid, can range from about 75 µm to about 475 µm, from about 125 µm to about 425 µm, or about 175 µm to about 375 µm. In another example, the hydrocarbon feedstock, if solid, can be ground to have an average particle size of about 300 µm or less. The hydrocarbon feedstock, if solid, can be introduced to the gasifier as a dry feed or can be conveyed to the gasifier as a slurry or suspension. Suitable fluids for forming a slurry or suspension can include, but are not limited to carbon dioxide, steam, water, nitrogen, air, syngas, or any combination thereof.

The initial hydrocarbon feedstock introduction rate to the gasifier can be less than a normal operating rate. For example, the initial introduction rate of the hydrocarbon feedstock can range from a low of about 1%, about 5%, about 10%, about 15%, or about 20% to a high of about 35%, about 40%, about 50%, about 60%, or about 70% of the normal operating rate. As the temperature within the gasifier stabilizes and/or increases the rate of hydrocarbon feedstock introduction can be increased toward a normal or optimal operating rate. For example, the rate of hydrocarbon feedstock introduction can be increased from an initial rate to a normal or optimal operating rate over a period of time of about 0.5 hours, about 1 hour, about 2 hours, about 3 hours, about 4 hours, or about 5 hours or more. In another example, the initial hydrocarbon feedstock introduction rate to the gasifier can be about or at the normal operating rate.

Once the gasifier has been transitioned from the first or initial state to the second or intermediate state, introduction of the first combustion gas can be stopped. The introduction of the first combustion gas can be stopped prior to, during, or after introduction of the second start-up fuel to the gasifier begins. For example, introduction of the second start-up fuel to the gasifier can be started and auto-ignition of the second fuel can begin prior to stopping the introduction of the first combustion gas. In another example, the introduction of the first combustion gas can increase the temperature within the gasifier a sufficient amount above the auto-ignition temperature of the second start-up fuel such that the introduction of the first combustion gas to the gasifier can be stopped and then the second start-up fuel can be introduced to the gasifier with the temperature within the gasifier remaining sufficient to combust at least a portion of the second start-up fuel.

Once the gasifier has been transitioned from the first or initial state to the hydrocarbon feedstock processing state, whether using the combination of the first combustion gas and the second combustion gas or only the second combustion gas, introduction of the second start-up fuel to the gasifier can be stopped. The introduction of the second start-up fuel can be stopped prior to, during, or after introduction of the hydrocarbon feedstock to the gasifier begins. For example, introduction of the hydrocarbon feedstock to the gasifier can be started and gasification, combustion, vaporization, cracking, and/or deposition of the hydrocarbon feedstock onto the particulates can begin prior to stopping the introduction of the second start-up fuel. In another example, the introduction of the first combustion gas and/or the second start-up fuel to the gasifier can increase the temperature within the gasifier a sufficient amount above the gasification temperature of the hydrocarbon feedstock such that the introduction of the second start-up fuel to the gasifier can be stopped and then the hydrocarbon feedstock can be introduced to the gasifier with the temperature within the gasifier remaining sufficient to gasify at least a portion of the hydrocarbon feedstock.

Various types of gasifiers can be transitioned from the first or initial state to the hydrocarbon feedstock gasification state using the second combustion gas or a combination of the first combustion gas and the second combustion gas. For example, the gasifier can be or include one or more circulating solids or transport gasifiers, one or more fixed bed gasifiers, one or more fluidized bed gasifiers, one or more entrained flow gasifiers, or a combination thereof. The particulates or solids within the gasifier, in addition to or in lieu of serving one or more other purposes, e.g., as a deposition surface for a portion of the hydrocarbon feedstock, the presence of the particulate or solids bed within the gasifier can improve heat retention within the gasifier and/or heat distribution throughout the gasifier.

The particulates or solids can include, but are not limited to, sand, ash, ceramic, limestone, or any combination thereof. The limestone can be crushed, pulverized, ground, powdered, or otherwise reduced in particle size. The ash can include any type of ash or mixtures thereof. Illustrative ash can include, but is not limited to, fly ash, gasifier ash, coarse ash, fine ash, or any combination thereof. As used herein, the terms "coarse ash" and "coarse ash particles" are used interchangeably and refer to particulates produced within a gasifier and having an average particle size ranging from a low of about 35 µm, about 45 µm, about 50 µm, about 75 µm or about 100 µm to a high of about 450 µm, about 500 µm, about 550 µm, about 600 µC, or about 640 µm. For example, coarse ash particulates can have an average particle size of from about 50 µm to about 350 µm, about 65 µm to about 250 µm, about 40 µm to about 200 µm, or about 85 µm to about 130 µm. As used herein, the terms "fine ash" and "fine ash particles" are used interchangeably and refer to particulates produced within a gasifier and having an average particle size ranging from a low of about 2 µm, about 5 µm, or about 10 µm to a high of about 75 µm, about 85 µm, or about 95 µm. For example, fine ash particulates can have an average particle size of from about 5 µm to about 30 µm, about 7 µm to about 25 µm, or about 10 µm to about 20 µm.

For a fixed particulate bed, the particulates can be disposed within the gasifier prior to starting the transition of the gasifier from the first state to the hydrocarbon feedstock gasification state. For a circulating solids or transport gasifier, the particulates can be introduced at any desired time, for example, before, during, and/or after transitioning the gasifier from the first or initial state to the final or operating state. For example, the particulates can be introduced or loaded into the gasifier prior to introducing the first combustion gas and/or the second start-up fuel thereto. In another example, the particulates can be introduced while introducing the first combustion gas and/or the second start-up fuel to the gasifier. In another example, the particulates can be introduced after the first combustion gas and/or the second start-up fuel are introduced to the gasifier but before introduction of the hydrocarbon feedstock. In another example, the particulates can be introduced after the first combustion gas and the second start-up fuel are introduced to the gasifier and after introduction of the hydrocarbon feedstock begins. In another example, at least a portion of the particulates can be introduced to the gasifier prior to introducing the first combustion gas and the second start-up fuel to the gasifier.

In addition to retaining heat within the gasifier, the particulates can be a carrier or support for the deposition for carbonaceous material, as discussed and described above, that can be produced when introduction of the hydrocarbon feedstock to the gasifier begins. The carbon containing particulates or "coked" particulates can be separated from the hot gas or syngas product and recycled within the gasifier where the carbon or coke deposited on the particulates can be combusted to produce heat and the regenerated particulates. The heat produced by combusting the carbon on the particulates can help to maintain the gasifier at the operating temperature.

In one or more embodiments, one or more sorbents can also be introduced to the gasifier. The sorbents can capture one or more contaminants from the syngas, such as sodium vapor in the gas phase within the gasifier. The sorbents can be used to dust or coat the hydrocarbon feedstock particles prior to or within the gasifier to reduce the tendency for the particles to agglomerate. The sorbents can be ground to an average particle size of about 5 microns to about 100 microns, or about 10 microns to about 75 microns. Illustrative sorbents can include, but are not limited to, carbon rich ash, limestone, dolomite, and coke breeze. Residual sulfur released from the second start-up fuel and/or the hydrocarbon feedstock can be captured by native calcium in the second start-up fuel and/or the hydrocarbon feedstock or by a calcium based sorbent to form calcium sulfide.

The FIGURE depicts an illustrative gasification system 100 for gasifying one or more hydrocarbon feedstocks, according to one or more embodiments. The gasification system 100 can include a single gasifier (one is shown 120) or two or more gasifiers arranged in series or parallel (not shown). The gasification system 100 can also include one or more start-up burners (one is shown 105). The start-up burner 105 can combust the first start-up fuel introduced via line 101 thereto to produce the first combustion gas via line 107 that can assist in the start-up or transition of the gasifier 120 from the first or initial state to the hydrocarbon feedstock processing state. It should be noted that the first combustion gas via line 107 can be introduced to one or more locations within the gasifier 120 via line 107 and/or a plurality of lines 107. Each gasifier 120 can include one or more mixing or introduction zones (two are shown 125, 130), one or more risers or gasification zones 135, one or more disengagers or separators (two are shown 140 and 145), one or more standpipes 150, and one or more transfer lines (four are shown 137, 141, 143, and 153). If the gasification system 100 includes two or more gasifiers 120, each gasifier 120 can be configured independent from the others or configured where any of the one or more mixing zones 125, 130; risers 135; separators 140, 145; and standpipes 150 can be shared. For simplicity and ease of description, embodiments of the gasifier 120 will be further described in the context of a single reactor train.

The first start-up fuel via line 101 and one or more oxidants via line 103 can be introduced to the start-up burner 105 and the first start-up fuel can be combusted therein to produce the first combustion gas via line 107. The start-up burner 105 can be or include any combustion device, system, or combination of devices and/or systems capable of combusting the first start-up fuel. For example, the start-up burner 105 can include a mixing zone for mixing the oxidant and the first start-up fuel and a combustion zone for combusting the first start-up fuel/oxidant mixture. The start-up burner 105 can have a turn down ratio of about 4 or less, about 3 or less, or about 2 or less. The start-up burner can include a refractory lined chamber that includes one or more burner nozzles where a mixture of liquid fuel, for example, together with an atomizing stream, steam for example, can be injected into the chamber and combusted in a stream of pressurized air or other oxidant to produce a flow of hot combustion products that can be introduced to the gasifier as the first combustion gas. Systems for fuel and oxidant flow control, ignition initiation detection, pilot burner control, diluent addition, and the like can be included in the start-up burner and can be linked to the gasifier control system.

The first combustion gas via line 107 can be introduced to the first mixing or introduction zone 125 of the gasifier 120. The first combustion gas can flow through the second mixing zone 130 and riser 135 and to the first separator 140 via transfer line 137. Heat from the first combustion gas can heat the gasifier 120 and, if present, the fluidized particulates 127 circulating through the gasifier 120. Although not shown, the first combustion gas via line 107 can be introduced to the second mixing zone 130, between the first and second mixing zones 125, 130, and/or the riser 135 in lieu of or in addition to the first mixing zone 125.

The first combustion gas and particulates 127 can exit the riser 135 and can be introduced via transfer line 137 to the first separator 140 where at least a portion of the particulates 127 can be separated therefrom to provide a first separated gas via transfer line 141 and separated particulates 127 via transfer line 143. In one or more embodiments, all or a portion of the separated particulates 127 via transfer line 143 can be recycled to the standpipe 150. In one or. more embodiments, all or a portion of the separated particulates 127 in transfer line 143 can be removed from the gasifier via line 144. Removing particulates 127 via line 144 from the gasifier 120 can be used to control the height of particulates within the standpipe 150 and/or the total amount of particulates within the gasifier 120. The first separated gas via transfer line 141 can be introduced to the second separator 145 where a second portion, if any, of the fluidized particulates 127 can be separated therefrom to produce a separated gas product or separated first combustion gas via line 147 and separated particulates that can be introduced to the standpipe 150.

The separators 140 and 145 can be or include any device, system, or combination of devises and/or systems capable of separating or removing at least a portion of the particulates from the first combustion gas, the second combustion gas, the gasified hydrocarbons or syngas, or any other fluids. Illustrative separators can include, but are not limited to, cyclones, desalters, and/or decanters.

The particulates 127 within the standpipe 150 can be recycled to the riser 135 via transfer or recycle line 153. The recycled particulates can be introduced to the first mixing zone 125, the second mixing zone 130, or, as shown, between the first and second mixing zones 125, 130. As discussed and described above, the particulates 127 can be loaded or otherwise disposed within the gasifier 120 prior to introducing the first combustion gas via line 107 to the gasifier 120. As such, circulation of the particulates 127 can begin prior to introducing the first combustion gas via line 107 to the first mixing zone 125. In another example, introduction and circulation of the particulates 127 can begin during and/or after introduction of the first combustion gas via line 107. One or more fluids via one or more fluid introduction lines (three are shown 142, 149, and 152) can be introduced to the transfer line 143, standpipe 150, and recycle line 153, respectively, in order to provide a motive fluid within the gasifier 120 for circulating the particulates 127 within the gasifier 120. Illustrative fluids introduced via lines 142, 149, 152 can include, but are not limited to, inert gases such as nitrogen, combustible gases such as recycled syngas, mixtures thereof, carbon dioxide, or any combination thereof.

The first combustion gas introduced via line 107 to the gasifier 120 can increase the temperature within the gasifier 120, and, if present, the particulates 127 circulating therein, from the first or initial temperature to the second or intermediate temperature. Once the gasifier 120 transitions from the first or initial state, the second start-up fuel via line 109 can be introduced to the gasifier 120. As shown, the second start-up fuel via line 109 can be introduced directly to the riser 135. For example, the second start-up fuel can be introduced through one or more nozzles or any other inlet device or combination of inlet devices disposed on the gasifier 120. In another example, the second start-up fuel via line 109 can be introduced to the riser 135, the second mixing zone 130, and/or the first mixing zone 125 through one or more nozzles or other inlet devices or combinations thereof. Preferably, the second start-up fuel is introduced to the gasifier downstream of the first combustion gas via line 107.

At least a portion of the second start-up fuel can combust or burn within the gasifier, e.g., the riser 135, to generate the second combustion gas and heat. The heat can be used to further increase the temperature within the gasifier 120 to the hydrocarbon feedstock operating temperature. The amount of oxidant within the gasifier 120 available for combusting the second start-up fuel can be controlled by introducing and/or reducing one or more oxidants introduced to the first mixing zone via line 117, the second mixing zone via line 113, with the second start-up fuel via line 109, and/or as a component of the first combustion as via line 107.

The second combustion gas and, if present, the first combustion gas and/or the circulating particulates 127 can be introduced via transfer line 137 to the first separator to provide the separated particulates via transfer line 143 and a second combustion gas and first combustion gas via transfer line 141. The second combustion gas and, if present, the first combustion gas can be introduced via transfer line 141 to the second separator 145 where at least a portion of any remaining particulates 127 can be separated therefrom and returned to the stand pipe 150 with the second combustion gas and first combustion gas recovered via line 147.

Introduction of the first combustion gas via line 107 can be stopped before, when, or after introduction of the second start-up fuel via line 109 begins. Introduction of the first combustion gas via line 107 can be stopped over a short period of time, e.g., less than about a minute, or gradually over an extended period of time, e.g., minutes, tens of minutes, or even hours. As such, stopping introduction of the first combustion gas via line 107 to the first mixing zone 125 can occur over a short period of time or can gradually transition from a full introduction rate to none.

Once the gasifier 120 transitions from the second or intermediate state to the hydrocarbon feedstock processing state, the hydrocarbon feedstock via line 111 can be introduced to the gasifier 120. As shown, the hydrocarbon feedstock via line 111 can be introduced to the second mixing zone 130. In another example, the hydrocarbon feedstock 111 can be introduced to the first mixing zone 125, the second mixing zone 130, and/or the riser 135. The amount of oxidant within the gasifier 120 available for combusting a portion of the hydrocarbon feedstock can be controlled by adjusting the amount of the one or more oxidants introduced to the first mixing zone via line 117, the second mixing zone via line 113, with the second start-up fuel via line 109, and/or as a component of the first combustion as via line 107. As discussed and described above at least a portion of the hydrocarbon feedstock introduced via line 111 can be gasified within the gasifier 120. In one or more embodiments, at least a portion of the hydrocarbon feedstock introduced via line 111 can also be combusted, vaporized, cracked, and/or deposited onto the circulating particulates 127 to produce a third combustion gas, vaporized hydrocarbons, cracked hydrocarbons, and/or carbon containing particulates. The hot gas product or syngas can be separated from the particulates (if present) via the first and second separators 140, 145 and recovered as a hot gas product or syngas via line 147.

At least a portion of the separated carbon containing particulates can be recycled via the transfer line 143 to the standpipe 150 and then recycled via the transfer line 153 to the first mixing zone 125, the second mixing zone 130, and/or the riser 135 where at least a portion of the carbon deposited thereon can be combusted to generate heat.

Introduction of the second start-up fuel via line 109 can be stopped before, when, or after introduction of the hydrocarbon feedstock via line 111 begins. Introduction of the second start-up fuel via line 109 can be stopped over a short period of time, e.g., less than about a minute, or gradually over an extended period of time, e.g., minutes, tens of minutes, or even hours. As such, stopping introduction of the second start-up fuel via line 109 to the riser 135 can occur over a short period of time or can gradually transition from a full introduction rate to none.

Although not shown, one or more valves or other flow restricting devices can be used to control or adjust the amount of oxidant in lines 103, 117, and 113, the first start-up fuel in line 101, the second start-up fuel in line 109, the hydrocarbon feedstock in line 111, the first combustion gas in line 107, the combustion gases or syngas produce in line 147, the fluids in lines 142, 149, and 152, and the particulates in line 144.

Any suitable type of circulating solids gasifier can be transitioned from the first or initial state to the hydrocarbon feedstock processing state using the combination of the first and second combustion gases and/or only the second combustion gas. Suitable circulating solids or transport gasifiers can be as discussed and described in U.S. Pat. No. 7,722,690 and U.S. Patent Application Nos. 2008/0081844, 2008/0155899, and 2009/0188165, 2010/0011664, and 2010/0132257.

Embodiments described herein further relate to any one or more of the following paragraphs:

1. A method for operating a gasifier, comprising: combusting a first start-up fuel to produce a first combustion gas; increasing a temperature within a gasifier from a starting temperature to at least an auto-ignition temperature of a second start-up fuel by introducing the first combustion gas to the gasifier; introducing a second start-up fuel directly to the gasifier after the temperature within the gasifier is at least the auto-ignition temperature of the second start-up fuel; combusting at least a portion of the second start-up fuel within the gasifier to produce a second combustion gas, wherein the second combustion gas produces sufficient heat to increase the temperature within the gasifier to a hydrocarbon feedstock gasification temperature; introducing a hydrocarbon feedstock to the gasifier; and gasifying at least a portion of the hydrocarbon feedstock within the gasifier to produce a syngas.

2. The method of paragraph 1, further comprising maintaining a sufficient amount of an oxidant within the gasifier to combust the at least a portion of the second start-up fuel, wherein the oxidant concentration in the second combustion gas is maintained below about 1 mol %.

3. The method of paragraph 1 or 2, further comprising maintaining a sufficient amount of an oxidant within the gasifier to combust a portion of the hydrocarbon feedstock, wherein the oxidant concentration in the syngas is maintained below about 1 mol %.

4. The method according to any one of paragraphs 1 to 3, wherein the second start-up fuel is introduced to the gasifier downstream relative to the first combustion gas.

5. The method according to any one of paragraphs 1 to 4, further comprising circulating particulates through the gasifier.

6. The method according to any one of paragraphs 1 to 5, further comprising circulating particulates through the gasifier prior to introducing the first combustion gas thereto, wherein circulation of the particulates is maintained during introduction of the second start-up fuel and introduction of the hydrocarbon feedstock.

7. The method of paragraph 5 or 6, wherein the particulates comprise sand, ash, ceramic, limestone, or any combination thereof.

8. The method according to any one of paragraphs 1 to 7, further comprising stopping introduction of the first combustion gas after introduction of the second start-up fuel begins.

9. The method according to any one of paragraphs 1 to 8, further comprising stopping introduction of the second start-up fuel after introduction of the hydrocarbon feedstock begins.

10. The method according to any one of paragraphs 1 to 9, wherein the auto-ignition temperature of the second start-up fuel ranges from about 200° C. to about 560° C., and wherein the hydrocarbon feedstock gasification temperature is about 700° C. or more.

11. The method according to any one of paragraphs 1 to 10, wherein the first combustion gas is produced within a start-up burner having a turn down ratio of about 3 or less.

12. The method according to any one of paragraphs 1 to 11, wherein the second start-up fuel comprises one or more hydrocarbons having from 1 to about 25 carbon atoms.

13. The method according to any one of paragraphs 1 to 12, wherein the second start-up fuel is diesel, and wherein the diesel has an auto-ignition temperature ranging from about 305° C. to about 325° C.

14. A method for operating a gasifier, comprising: circulating particulates through a gasifier; increasing a temperature within the gasifier from an initial temperature to an intermediate temperature by introducing a first combustion gas to the gasifier, wherein the first combustion gas is produced by combusting a first start-up fuel, and wherein the intermediate temperature is sufficient to auto-ignite a second start-up fuel; introducing a second start-up fuel directly to the gasifier after the gasifier is at the intermediate temperature, wherein the second start-up fuel is introduced to the gasifier downstream relative to the first combustion gas; combusting at least a portion of the second start-up fuel within the gasifier to increase the temperature within the gasifier to an operating temperature, wherein the operating temperature is sufficient to gasify a hydrocarbon feedstock; stopping introduction of the first combustion gas after introduction of the second start-up fuel begins; introducing the hydrocarbon feedstock to the gasifier after the gasifier is at the operating temperature; gasifying at least a portion of the hydrocarbon feedstock within the gasifier to produce a syngas; and stopping introduction of the second start-up fuel after introduction of the hydrocarbon feedstock begins.

15. The method of paragraph 14, wherein the intermediate temperature ranges from about 200° C. to about 560° C., and wherein the operating temperature is about 700° C. or more.

16. The method of paragraph 14 or 15, further comprising maintaining a sufficient amount of an oxidant within the gasifier to combust the at least a portion of the second start-up fuel, wherein the oxidant is introduced to the gasifier as a component of the first combustion gas, directly to the gasifier, as a component of the second start-up fuel, combined with one or more inert gases, or any combination thereof, and wherein the oxidant concentration in the second combustion gas is maintained below about 1 mol %.

17. The method according to any one of paragraphs 14 to 16, further comprising increasing a pressure within the gasifier from an initial pressure to an operating pressure as the temperature within the gasifier is increased from the initial temperature to the operating temperature.

18. The method according to any one of paragraphs 14 to 17, wherein the first combustion gas is produced within a start-up burner having a turn down ratio of about 3 or less.

19. A system for gasifying a hydrocarbon feedstock, comprising: a gasifier; a start-up burner for combusting a first start-up fuel to produce a first combustion gas; a transfer line in fluid communication with a combustion gas outlet of the start-up burner and a combustion gas inlet of the gasifier for introducing the first combustion gas to the gasifier; and a second start-up fuel nozzle disposed on the gasifier and adapted to introduce a second start-up fuel to the gasifier.

20. The system of paragraph 19, wherein the second start-up fuel nozzle is disposed on the gasifier downstream from the combustion gas inlet of the gasifier.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for operating a gasifier, comprising:
combusting a first start-up fuel to produce a first combustion gas;

increasing a temperature within a gasifier from a starting temperature to at least an auto-ignition temperature of a second start-up fuel by introducing the first combustion gas to the gasifier;

introducing the second start-up fuel directly to the gasifier after the temperature within the gasifier is at least the auto-ignition temperature of the second start-up fuel;

combusting at least a portion of the second start-up fuel within the gasifier to produce a second combustion gas, wherein the second combustion gas produces sufficient heat to increase the temperature within the gasifier to a hydrocarbon feedstock gasification temperature;

introducing a hydrocarbon feedstock to the gasifier; and gasifying at least a portion of the hydrocarbon feedstock within the gasifier to produce a syngas.

2. The method of claim 1, further comprising maintaining a sufficient amount of an oxidant within the gasifier to combust at least a portion of the second start-up fuel, wherein the oxidant concentration in the second combustion gas is maintained below about 1 mol%.

3. The method of claim 1, further comprising maintaining a sufficient amount of an oxidant within the gasifier to combust a portion of the hydrocarbon feedstock, wherein the oxidant concentration in the syngas is maintained below about 1 mol%.

4. The method of claim 1, wherein the second start-up fuel is introduced to the gasifier downstream relative to the first combustion gas.

5. The method of claim 1, further comprising circulating particulates through the gasifier.

6. The method of claim 1, further comprising circulating particulates through the gasifier prior to introducing the first combustion gas thereto, wherein circulation of the particulates is maintained during introduction of the second start-up fuel and introduction of the hydrocarbon feedstock.

7. The method of claim 6, wherein the particulates comprise sand, ash, ceramic, limestone, or any combination thereof.

8. The method of claim 1, further comprising stopping introduction of the first combustion gas after introduction of the second start-up fuel begins.

9. The method of claim 1, further comprising stopping introduction of the second start-up fuel after introduction of the hydrocarbon feedstock begins.

10. The method of claim 1, wherein the auto-ignition temperature of the second start-up fuel ranges from about 200° C. to about 560° C., and wherein the hydrocarbon feedstock gasification temperature is about 700° C. or more.

11. The method of claim 1, wherein the gasifier is heated to the hydrocarbon feedstock gasification temperature before the hydrocarbon feedstock is introduced to the gasifier.

12. The method of claim 1, wherein the second start-up fuel comprises one or more hydrocarbons having from 1 to about 25 carbon atoms.

13. The method of claim 1, wherein the second start-up fuel is diesel, and wherein the diesel has an auto-ignition temperature ranging from about 305° C. to about 325° C.

14. A method for operating a gasifier, comprising:

circulating particulates through a gasifier;

increasing a temperature within the gasifier from an initial temperature to an intermediate temperature by introducing a first combustion gas to the gasifier, wherein the first combustion gas is produced by combusting a first start-up fuel, and wherein the intermediate temperature is sufficient to auto-ignite a second start-up fuel;

introducing the second start-up fuel directly to the gasifier after the gasifier is at the intermediate temperature, wherein the second start-up fuel is introduced to the gasifier downstream relative to the first combustion gas;

combusting at least a portion of the second start-up fuel within the gasifier to increase the temperature within the gasifier to an operating temperature, wherein the operating temperature is sufficient to gasify a hydrocarbon feedstock;

stopping introduction of the first combustion gas after introduction of the second start-up fuel begins;

introducing the hydrocarbon feedstock to the gasifier after the gasifier is at the operating temperature;

gasifying at least a portion of the hydrocarbon feedstock within the gasifier to produce a syngas; and stopping introduction of the second start-up fuel after introduction of the hydrocarbon feedstock begins.

15. The method of claim 14, wherein the intermediate temperature ranges from about 200° C. to about 560° C., and wherein the operating temperature is about 700° C. or more.

16. The method of claim 14, further comprising maintaining a sufficient amount of an oxidant within the gasifier to combust the at least a portion of the second start-up fuel, wherein the oxidant is introduced to the gasifier as a component of the first combustion gas, directly to the gasifier, as a component of the second start-up fuel, combined with one or more inert gases, or any combination thereof, and wherein the oxidant concentration in the second combustion gas is maintained below about 1 mol%.

17. The method of claim 14, further comprising increasing a pressure within the gasifier from an initial pressure to an operating pressure as the temperature within the gasifier is increased from the initial temperature to the operating temperature.

18. The method of claim 14, wherein the first combustion gas is produced within a start-up burner having a turn down ratio of about 3 or less.

19. A system for gasifying a hydrocarbon feedstock, comprising:

a gasifier having a riser disposed therein;

a start-up burner for combusting a first start-up fuel to produce a first combustion gas;

a transfer line in fluid communication with a combustion gas outlet of the start-up burner and a combustion gas inlet of the riser for introducing the first combustion gas to the gasifier;

a second start-up fuel nozzle disposed on the riser and adapted to introduce a second start-up fuel to the gasifier;

a hydrocarbon feed line in fluid communication with the riser downstream of the combustion gas inlet and upstream of the second start-up fuel nozzle; and a particulate recycle line in fluid communication with the riser at a location downstream of the combustion gas inlet and upstream of the hydrocarbon feed line.

20. The system of claim 19, further comprising a first oxidant supply line in fluid communication with the riser upstream of the combustion gas inlet and a second oxidant supply line in fluid communication with the riser downstream of the combustion gas inlet and upstream of the hydrocarbon feed line, wherein the combustion gas inlet of the riser, the second start-up fuel nozzle, and the hydrocarbon feed line are all in fluid communication with the riser between a first and second end thereof.

* * * * *